(12) United States Patent
Gatto et al.

(10) Patent No.: US 12,442,767 B2
(45) Date of Patent: Oct. 14, 2025

(54) LAB-ON-A-CHIP SYSTEM WITH FUNCTIONALIZED WAVEGUIDE

(71) Applicant: Carl Zeiss Jena GmbH, Jena (DE)

(72) Inventors: Alexandre Gatto, Bergisch Gladbach (DE); Michael Totzeck, Oberkochen (DE)

(73) Assignee: Carl Zeiss Jena GmbH, Jena (DE)

( * ) Notice: Subject to any disclaimer, the term of this patent is extended or adjusted under 35 U.S.C. 154(b) by 184 days.

(21) Appl. No.: 18/265,361

(22) PCT Filed: Dec. 17, 2021

(86) PCT No.: PCT/EP2021/086428
§ 371 (c)(1),
(2) Date: Jun. 5, 2023

(87) PCT Pub. No.: WO2022/129483
PCT Pub. Date: Jun. 23, 2022

(65) Prior Publication Data
US 2024/0035975 A1  Feb. 1, 2024

(30) Foreign Application Priority Data
Dec. 17, 2020 (DE) .......................... 102020133924.0

(51) Int. Cl.
*G01N 21/64* (2006.01)
*G01N 21/03* (2006.01)

(52) U.S. Cl.
CPC ... *G01N 21/645* (2013.01); *G01N 2021/0346* (2013.01); *G01N 2021/6482* (2013.01); *G01N 2201/0873* (2013.01)

(58) Field of Classification Search
CPC .. G01N 21/645; G01N 21/7746; G01N 21/17; G01N 21/05; G01N 21/85;
(Continued)

(56) References Cited

U.S. PATENT DOCUMENTS 6,438,279 B1 * 8/2002 Craighead ................ G02B 6/10
385/12
2001/0001021 A1   5/2001 Kraus et al.
(Continued)

FOREIGN PATENT DOCUMENTS

DE   102009045128 A1   3/2011
EP      3223945 A1   10/2017
(Continued)

OTHER PUBLICATIONS

Zuchowska, Agnieszka et al. "3D lung spheroid cultures for evaluation of photodynamic therapy (PDT) procedures in microfluidic Lab-on-a-Chip system." Analytica chimica acta 990 (2017): 110-120. https://www.semanticscholar.org/paper/3D-lung-spheroid-cultures-for-evaluation-of-therapy-Zuchowska-Jastrz%C4%99bska/bd0482ee1ad4d0a0596079c0b160622ff42202f3.
(Continued)

*Primary Examiner* — Michael A Lyons
(74) *Attorney, Agent, or Firm* — Seyfarth Shaw LLP; Brian Michaelis (57) ABSTRACT

A lab-on-a-chip system comprises an optical detection waveguide that has an at least partially periodic structure that is configured to couple light from surroundings of the optical detection waveguide into the optical detection waveguide. The lab-on-a-chip system furthermore also comprises a microfluidic network, wherein the microfluidic network has multiple lines and at least one reaction chamber.

19 Claims, 6 Drawing Sheets

(58) Field of Classification Search
CPC ... G01N 2201/0873; G01N 2021/0346; G01N 2021/7789; G01N 33/02; G01N 1/02; G01N 21/77; G01N 21/03; G01N 21/0303; G01N 21/64; G01N 21/6452; G01N 21/6456; G01N 33/54373; G01N 2201/08; G01N 2021/6482; B01L 2300/0654; B01L 2200/10; B01L 3/502707; B01L 3/502715; B82Y 20/00; C12Q 1/6825; C12Q 1/6869; C12Q 1/6874
USPC ........ 356/246, 432–440, 417, 445–448, 477; 385/12, 129, 30, 37, 130; 422/82.09, 422/82.05, 82.11
See application file for complete search history.

(56) References Cited

U.S. PATENT DOCUMENTS

| | | | | |
|---|---|---|---|---|
| 2002/0181837 | A1* | 12/2002 | Wang | H05H 3/04 385/12 |
| 2009/0244542 | A1* | 10/2009 | Cho | G01N 21/553 356/445 |
| 2010/0105035 | A1* | 4/2010 | Hashsham | G01N 21/645 435/6.19 |
| 2012/0021525 | A1* | 1/2012 | Fehr | G01N 21/6428 250/226 |
| 2014/0319378 | A1* | 10/2014 | Van Steenberge | G01N 21/6428 264/1.24 |
| 2015/0146203 | A1 | 5/2015 | Lai et al. | |
| 2017/0016827 | A1* | 1/2017 | Gervais | G01N 21/648 |
| 2017/0052384 | A1 | 2/2017 | Santori et al. | |
| 2020/0108387 | A1 | 4/2020 | Dong et al. | |
| 2020/0233158 | A1 | 7/2020 | Meng et al. | |
| 2021/0354128 | A1* | 11/2021 | Meng | G01N 21/31 |
| 2022/0074859 | A1* | 3/2022 | Sun | G01N 21/7703 |

FOREIGN PATENT DOCUMENTS

| | | |
|---|---|---|
| WO | WO2008096296 A1 | 8/2008 |
| WO | WO2020019921 A1 | 1/2020 |
| WO | WO2020157309 A1 | 8/2020 |

OTHER PUBLICATIONS

Sung Hwan Cho et al., "Microfluidic Photonic Integrated Circuits", Optoelectron Mater Devices. Nov. 18, 2008; 7135: 71350M, doi: 10.1117/12.807153. https://www.researchgate.net/profile/Yu-Hwa-Lo/publication/43352455_Microfluidic_Photonic_Integrated_Circuits/links/5579cbef08aeb6d8c02058a7/Microfluidic-Photonic-Integrated-Circuits.pdf [researchgate.net].

Moleshi, Behzad, et al. "Multifunctional, Integrated, Photonic Lab-on-a-Chip for Astronaut Heath Monitoring." Sep. 1, 2018, Tech Briefs. https://www.techbriefs.com/component/content/article/tb/features/articles/32846 [techbriefs.com].

Wikipedia. "Lab-on-a-Chip." https://de.wikipedia.org/wiki/Lab-on-a-Chip [de.wikipedia.org].

* cited by examiner

FIG. 12

LAB-ON-A-CHIP SYSTEM WITH FUNCTIONALIZED WAVEGUIDE

CROSS-REFERENCE TO RELATED APPLICATION DATA

This application is a national stage application of International Application No. PCT/EP2021/086428 filed on Dec. 17, 2021, which claims priority from German Patent Application No. DE102020133924.0 filed on Dec. 17, 2020, both of which are incorporated herein by reference in their entirety.

TECHNICAL FIELD

Various examples of the invention relate to a compact lab-on-a-chip system having an optical waveguide that has an at least partially periodic structure. The at least partially periodic structure may form an input coupling region in order to couple light coming from a reaction chamber of a microfluidic network into the waveguide; the at least partially periodic structure may also form an output coupling region in order to emit light to the reaction chamber.

BACKGROUND

The term lab-on-a-chip (or lab-on-a-chip device) denotes a microfluidic network that accommodates at least parts of the functionality of a macroscopic laboratory on a substrate. Typically, the dimensions of the substrate are comparatively small, roughly of the order of magnitude of a chip card.

A lab-on-a-chip may be used to analyze small amounts (a few picoliters to microliters) of a liquid. Samples are transported between the different reaction and analysis chambers with the aid of capillary forces.

Typically—to evaluate a process—optical detection by light takes place. For example, a microscope may be used to observe a reaction chamber of the lab-on-a-chip.

Using a microscope to illuminate and/or detect a microfluidic network in a lab-on-a-chip is space-consuming and expensive.

BRIEF SUMMARY OF THE INVENTION

There is therefore a need for lab-on-a-chip systems that are implemented in a particularly compact manner and that, in addition to the microfluidic network, also provide integrated optical detection and/or optical excitation. There is in particular a need for integrated optical targeted detection, that is to say detection that is wavelength-selective and/or has a high spatial resolution. There is also a need for targeted excitation, that is to say excitation that is well-defined in the spatial domain and/or wavelength spectrum.

This object is achieved by the features of the independent patent claims. The features of the dependent patent claims define embodiments.

In line with the techniques described herein, it is possible to provide a highly compact lab-on-a-chip system. In addition to the classic microfluidic function—provided by a microfluidic network—this may also enable targeted optical excitation and/or targeted optical detection in a compact, multifunctional element.

A description is given below of techniques that relate to such a multifunctional, high-resolution, energy-efficient simultaneous-spectrum lab-on-a-chip system that has an integrated optical detection function and/or has an integrated optical excitation function.

A lab-on-a-chip system comprises an optical detection waveguide. The optical detection waveguide has an at least partially periodic structure. This is configured to couple light from surroundings of the optical waveguide into the optical waveguide. The lab-on-a-chip system furthermore comprises a microfluidic network. The microfluidic network has multiple lines and at least one reaction chamber. The lab-on-a-chip system is configured such that the at least one reaction chamber of the microfluidic network is able to be arranged in the surroundings of the partially periodic structure.

Capillary forces may be used to move liquids in the lines of the microfluidic network, for example from source chambers to the at least one reaction chamber. The at least one reaction chamber may be designed as a cavity in a corresponding substrate. The at least one reaction chamber may have one or more feed lines that are implemented by one or more lines of the microfluidic network. The at least one reaction chamber could also comprise one or more discharge lines that are implemented by one or more lines of the microfluidic network. Chemical and/or physical and/or biological processes may take place in the at least one reaction chamber. Such a process may then be monitored as part of the optical detection. As an alternative or in addition, such a process may also be supplied with energy by the optical excitation. The microfluidic network thereby forms a lab-on-a-chip.

As a general rule, optical waveguides as described herein may comprise a central region and a cladding region. Light propagates in the central region and is totally reflected at the interface with the cladding region. This is achieved through an appropriate choice of materials with different refractive indices. For example, it is thereby possible to use planar or curved waveguides that are integrated in a substrate. As may be seen in FIGS. 1-5, the input-coupled light in the waveguide is propagated along a longitudinal surface or longitudinal axis of the light guide. In other words, a propagation direction or propagation surface of the light (for example averaged over the length of the waveguide) in the waveguide essentially runs along two interfaces of the waveguide. The propagation surface of the detection waveguide may essentially extend at least partially along and/or parallel to the propagation surface of the illumination waveguide. The propagation surfaces of the detection waveguide or of the illumination waveguide, or both, may essentially extend at least partially along and/or parallel to a median plane/surface of the fluid system and/or of the reaction chamber. The propagation direction in the detection waveguide may not be along, for example counter to, the propagation direction in the illumination waveguide.

The at least partially periodic structure of the detection waveguide may form an input coupling region because the light is coupled into the detection waveguide.

As a general rule, in the various examples described herein, at least partially periodic structures may be used to functionalize optical waveguides. An example in which the at least partially periodic structure of the detection waveguide forms the input coupling region was described above. However, it would also be conceivable to use at least partially periodic structures to form an output coupling region, for instance in the detection waveguide—for example adjacent to a detector—or else also in an illumination waveguide—for instance in order to emit light to the at least one reaction chamber—which is present as an alternative or in addition to the detection waveguide.

The at least partially periodic structures that are described herein may be combined with filters. For example, spectral filtering may be performed. The filter parameters may be varied as a function of the location of the at least partially periodic structures. This makes it possible to achieve extended functionalization. For example, it is possible to achieve wavelength dependency of an imaging optical function. Interfering light may be filtered.

As a general rule, in the various examples described herein, at least partially periodic structures may be formed differently. However, the various variants may all be used equally or in combination to functionalize waveguides. Some examples of at least partially periodic structures are summarized below in Table 1.

TABLE 1

Various variants for partially periodic structures that are able to form input coupling and/or output coupling regions of optical waveguides in the various examples described herein. Such partially periodic structures make it possible to provide the desired beam shaping and the desired imaging property in an installation space-optimized manner. In particular, it is possible to save on further optical elements, which leads to a compact design with at the same time low weight.

| | Brief description | Details |
|---|---|---|
| I | Purely diffractive, in particular grating structure | For example, diffractive structures may have a purely diffractive effect on light, that is to say have no or no significant refractive component. Use is made of diffraction effects that are caused by constructive and destructive interference of light. This is also referred to as a diffractive optical element (DOE). For example, use could be made of a grating structure that produces diffraction maxima and diffraction minima through positive and negative interference. The grating structure may be achieved for example by varying the thickness of an optical material. The grating structure may be achieved for example by differently oriented interfaces between different optical materials. For example, it is possible to use relief gratings, that is to say for example gratings that are formed on a surface of the optical waveguide. For example, the relief grating could be inscribed into the material by a laser beam. Material may be removed locally. The diffractive structures may be designed such that they encode light from different horizontal fields of view during the deflection by way of different deflected wavelengths, such that selective output coupling and/or detection is possible for the different horizontal fields of view. Examples of implementations of diffractive structures, their relative arrangement in relation to one another or in relation to waveguides, etc. are described in WO 2020/157309. Appropriate techniques may be applied here. |
| II | Hologram, in particular volume hologram | A hologram is one specific example of a purely diffractive structure, see Example I. In this case, Bragg reflections occur on an at least partially periodic structure, which is typically inscribed into a material by varying the refractive index. To this end, for example, it is possible to use polymer materials that bring about the variation of the refractive index by locally changing the chain length. A corresponding holographic optical element (HOE) may be adhesively bonded onto an optical waveguide, for example in the form of a film. An HOE may also be designed as a volume hologram, that is to say integrated into an optical waveguide. An HOE is able to provide intrinsic wavelength selectivity, that is to say it is able to be spectrally filtered in a targeted manner. Multiple HOEs may also be used in combination. The HOEs may be arranged adjacently (with or without a spacing between them); they may in particular be arranged adjacently along the longitudinal axis of a corresponding waveguide. However, it is also possible for the HOEs to be arranged one on top of the other or one above the other, resulting in a layer stack of volume holograms, |

TABLE 1-continued

Various variants for partially periodic structures that are able to form input coupling and/or output coupling regions of optical waveguides in the various examples described herein. Such partially periodic structures make it possible to provide the desired beam shaping and the desired imaging property in an installation space-optimized manner. In particular, it is possible to save on further optical elements, which leads to a compact design with at the same time low weight.

| | Brief description | Details |
|---|---|---|
| | | as it were. Different volume holograms may also be implemented in the same volume element. This means that there may be a local overlap. Such an implementation is also called multiplexing. Multiplexing may be practical for volume holograms in particular. |
| III | Combination of diffractive with refractive | It would also be possible for diffractive structures, in addition to the diffractive shaping of a light beam, to also bring about refractive shaping of the light beam (this could then also be referred to as a diffractive-refractive structure). For example, a lens element—for instance a plano-convex lens with a Fresnel structure—could be used. In this case, the Fresnel structure is preferably formed on the plane side of the plano-convex lens. However, it may also be provided on the convex side. The convex side of the plano-convex lens is preferably spherically curved. However, it may also have an aspherical curvature or some other curvature. Furthermore, a purely diffractive beam-shaping element of the diffractive structure (DOE) may be formed on the convex side if the Fresnel structure is provided on the plane side of the plano-convex lens. The diffractive element may be designed for imaging and/or for color correction. The Fresnel structure may have multiple Fresnel segments, wherein the optically active facets of the Fresnel segments correspond optically to an imaginary optically active surface that is curved. The optical active surface may not have mirror symmetry or rotational symmetry. In particular, the optical active surface may not have translational symmetry. Details of a corresponding Fresnel structure are described for example in: DE102009045128 A1. |
| IV | Quasi-refractive | In order to achieve a quasi-refractive optical effect through diffractive beam shaping, it is possible to use for example a blazed grating (also called an echelette grating), in which however a phase change by a multiple of 2*Pi occurs over one grating period. Such a quasi-refractive structure may be referred to as a Fresnel structure. One or more grating parameters are varied or set such that a diffraction efficiency for a specific diffraction order is maximized. Optical imaging may thereby be enabled. |
| V | Refractive and/or reflective | An at least partially periodic structure with a refractive and/or reflective effect could be used. The beam shaping may then be described solely by beam optics, without diffraction phenomena having to be taken into account. For example, a grating structure—for instance a mirrored one—could be used, the periodicity of which is significantly greater than the light wavelength. A Fresnel lens with multiple Fresnel elements may be used. Individual periodic sections may then have a specific curvature and steer the light in the desired direction. Wavelength selectivity may be achieved for example by providing a wavelength filter. |

As a general rule, the periodic structure may be strictly periodic. However, it would also be possible for one or more design parameters to vary as a function of the location. For example, filter parameters of a filter layer could vary. Index variations could also be used in the example of the HOE, or variations of the grating unit cell could be used in the example of a DOE. For example, such variations may make it possible to achieve wavelength-selective input coupling or output coupling of light or an imaging optical function in a targeted manner. A higher degree of functionalization may thereby be achieved.

As a further general rule, such at least partially periodic structures that are used to functionalize optical waveguides may be designed to be partially transparent. Due to the at least partially periodic structure, transparency may be maintained over a large angular and wavelength range during normal viewing. The transparency may in this case be dependent on the coupling efficiency. As coupling efficiency increases, transparency may also decrease. In terms of the greatest possible transparency, the input coupling of radiation or output coupling of radiation into or out of a waveguide, for example through the at least partially periodic structure, may be just so efficient that a sufficient number of photons is coupled into or coupled out of the optical waveguide. The at least partially periodic structures—in particular when designed as a diffractive structure, see Table 1, Examples I, II, III, IV—may exhibit angle of incidence-dependent wavelength selectivity, such that they have high transparency for a large angular and wavelength range. In other words, this means that, depending on the angle of incidence, light of different wavelengths may be coupled efficiently into or out of a corresponding optical waveguide.

In various examples, it would be conceivable for the detection waveguide also to have an output coupling region. This may be arranged adjacent to a detector. The output coupling region may have a mirror surface, a prism and/or a reflective or transmissive Fresnel structure. These variants may be provided as an alternative to the partially periodic structure or in addition to a partially periodic structure of the output coupling region.

The output coupling region may be configured so as to couple the light—coupled into the detection waveguide from the partially periodic structure of the input coupling region—out of the detection waveguide in the direction of the detector.

The detector may for example be a multi-pixel detector. The detector may implement a digital image sensor such as for example a CCD sensor or a CMOS sensor or a SPAD array or a silicon photomultiplier. Single-photon detection would be conceivable. The multi-pixel detector may thereby be actuated so as to provide image data.

It is possible in this case for the at least partially periodic structure implementing the input coupling region and the output coupling region to be configured to generate an image of the at least one reaction chamber on a sensitive surface of the detector.

This thus means that the at least partially periodic structure is configured—here in conjunction with the output coupling region—to transmit the light with an imaging optical function.

Different pixels that are defined by this imaging optical function may then in this case be associated with different wavelengths of the light. This may be achieved in that different pixels have different distances from the optical axis and thus the light emitted by the respective pixel impinges on the at least partially periodic structure at a corresponding angle; together with the wavelength selectivity of the coupling efficiency described above, this makes it possible to achieve a situation whereby different pixels are associated with different wavelengths. A further variant for generating wavelength selectivity would be to use different absorption filters, which are attached for example to different Fresnel elements of a Fresnel structure, wherein the different Fresnel elements are then in turn assigned to different pixels.

It would be possible for no further optical imaging element to be arranged between the detector and the output coupling region. This enables a particularly compact design. Here, focusing on the sensitive surface may be achieved through the imaging optical function of the input coupling region in conjunction with the output coupling region. In other variants, however, it would be possible for at least one optically imaging element also to be arranged. The at least one optically imaging element serves in particular for guiding that portion of the light that is deflected by the output coupling region, and may be designed for example as a lens element. The at least one optically imaging element may be designed for example as a lens, as a refractive lens or as a refractive camera lens.

The at least partially periodic structure implementing the input coupling region and the output coupling region may implement infinite-infinite imaging or finite-infinite imaging or infinite-finite imaging or finite-finite imaging.

The at least one reaction chamber may be arranged—in relation to the imaging optical function of the partially periodic structure of the optical detection waveguide—in the near field of the partially periodic structure. For example, further lens elements or other optically active elements between the input coupling region and the reaction chamber are not necessary.

As a general rule, the spatial resolution of an optical imaging function that is provided by the functionalized detection waveguide may be used to select between different reaction chambers, or optionally also between different positions within a specific reaction chamber. This is explained in more detail below.

The at least one reaction chamber may comprise a multiplicity of reaction chambers. It is then possible for the at least partially periodic structure and the output coupling region to be configured so as to image pixels of the image, which correspond to object points of different reaction chambers of the multiplicity of reaction chambers, onto different pixels of the multi-pixel detector. This means that resolution may be achieved by assigning different reaction chambers to different pixels. It is thereby possible to separate data that are associated with different reactions or processes in the different reaction chambers inherently through the different channels of the multi-pixel detector. This makes it possible to quickly and easily monitor multiple reactions or processes in the different reaction chambers.

In this context, it would for example be conceivable for the wavelength dependency of the imaging optical function to be utilized in order to examine, in a targeted manner, specific spectral ranges in connection with the reactions or processes in the different reaction chambers. In other words, this means that it would be possible to select, in a targeted manner, the assignment of processes to reaction chambers depending on the wavelengths measured in connection with the respective reaction chamber. In the example of a DOE or HOE as a partially periodic structure, such wavelength selectivity may be provided inherently by the structure—without it being necessary to provide spectral filters beyond the one or more diffractive structures. For example, the wavelength of an excitation could also be set accordingly when using for example a tunable light source—that is to say a light source that is able to be actuated so as to emit light with different wavelengths—as explained in more detail below.

As an alternative or in addition to such a separation of the imaging of different reaction chambers as described above, it would also be conceivable to detect different positions within a reaction chamber in a spatially resolved manner, that is to say to capture an image of a reaction chamber in a spatially resolved manner. It would thus be possible for the at least partially periodic structure and the output coupling region to be configured so as to image pixels of the image, which correspond to object points at different positions within the at least one reaction chamber, onto different pixels of the multi-pixel detector.

Such a spatially resolved image of a reaction chamber also enables more complicated applications. For example, it would be conceivable for a computing unit of the lab-on-a-chip system to be configured to count objects of a predefined type in such an image. For example, white blood cells could be counted as part of blood analysis. Another example would concern counting malaria parasites per blood volume. This thus enables implementation of applications that require a spatially resolved image of a reaction chamber in an integrated lab-on-a-chip system—without it being necessary to use an external microscopy device for the imaging.

In the various examples, it would be conceivable for the optical detection waveguide and the microfluidic network to be arranged on a common substrate. A particularly high degree of integration may thereby be achieved. The lab-on-a-chip system may be provided with particularly small external dimensions.

However, it would also be conceivable for the optical detection waveguide and microfluidic network to be arranged on different substrates. It would then be conceivable to position the two substrates adjacent to one another when performing the measurement. For example, the lab-on-a-chip system could already comprise a corresponding guide element that is configured to enable a relative movement of the different substrates with respect to one another. For example, the guide element could be implemented by guide rails. Such an embodiment with two separate substrates may have the advantage that the substrate with the optical elements (photonic chip) may be used for excitations and/or measurements together with multiple substrates that comprise corresponding microfluidic networks (laboratory chip).

As already described above, it would be conceivable for the lab-on-a-chip system to have an optical illumination waveguide (as an alternative to or in addition to the detection waveguide). The lab-on-a-chip system may also have a light source that is optically coupled to the illumination waveguide in order to emit the light and/or additional light (for example for exciting fluorescence) that is then coupled into the detection waveguide. For example, the light source may be formed in a manner integrated on the corresponding substrate. It is thereby possible to provide on-chip illumination that is therefore particularly highly integrated.

In particular, it is possible to use a tunable light source, that is to say a light source that is configured to emit the light and/or the additional light with an adjustable wavelength. By selecting a specific wavelength, it is possible to influence specific processes in the reaction chambers in a targeted manner. A computing unit may accordingly be configured so as to actuate the light source in order to feed the light and/or the additional light into the illumination waveguide. The computing unit may furthermore be configured to select the adjustable wavelength of the light and/or of the additional light on the basis of a wavelength dependency of an optical imaging function of the further partially periodic structure and/or of the partially periodic structures. It is thereby possible for example to select one of multiple reaction chambers for the excitation and/or detection in a targeted manner if, for example, different pixels of the optical imaging function are assigned to different reaction chambers.

A lab-on-a-chip system according to a further aspect comprises an optical illumination waveguide. This has an at least partially periodic structure. It is configured to couple light out of the optical illumination waveguide into surroundings of the optical illumination waveguide. The lab-on-a-chip system furthermore also comprises a microfluidic network. This has multiple lines and at least one reaction chamber. The lab-on-a-chip system is configured such that the at least one reaction chamber of the microfluidic network is able to be arranged in the surroundings of the optical illumination waveguide.

As already described above in connection with the optical detection waveguide, an at least partially periodic structure may be configured to transmit the light with an imaging optical function, wherein different pixels, which are defined by the imaging optical function, are optionally associated with different wavelengths of the light. This enables wavelength-resolved illumination, that is to say a selection may be made between different wavelengths in terms of location and optionally time. Specific reactions may thereby be excited in a targeted manner.

Such lab-on-a-chip systems as described above may be used for a variety of applications. For example, it would be conceivable to use such lab-on-a-chip systems for microscopic blood analysis or else for fluorescence measurements. Even such complicated applications, which for example require spatially resolved detection, may be made possible by using the functionalized optical waveguide for excitation and/or detection with a high degree of integration.

It would be conceivable for the integrated optical excitation and/or detection to be combined with external optical excitation and/or detection. To this end, the lab-on-a-chip system may be used for example in combination with a microscopy device. According to the various examples described herein, the functionalized optical waveguides—in particular the partially periodic structures—may specifically be designed to be at least partially transparent for a specific wavelength range of light. The external optical device, for example the microscopy device, may then emit additional light to the at least one reaction chamber and/or detect said light therefrom, in a manner spatially superimposed with the integrated optical excitation and/or detection. Wavelength multiplexing is thus made possible. This increases use flexibility.

The features set out above and features that are described below may be used not only in the corresponding combinations explicitly set out, but also in further combinations or in isolation, without departing from the scope of protection of the present invention.

BRIEF DESCRIPTION OF THE FIGURES

The properties, features and advantages of this invention described above and the way in which they are achieved will become clearer and more clearly understood in association with the following description of the exemplary embodiments which are explained in greater detail in association with the drawings.

DETAILED DESCRIPTION OF EMBODIMENTS

The present invention is explained in greater detail below on the basis of preferred embodiments with reference to the drawings. In the figures, identical reference signs denote identical or similar elements. The figures are schematic representations of various embodiments of the invention. Elements illustrated in the figures are not necessarily illustrated as true to scale. Rather, the various elements illustrated in the figures are rendered in such a way that their function and general purpose become comprehensible to a person skilled in the art. Connections and couplings between functional units and elements as illustrated in the figures may also be implemented as an indirect connection or coupling. A connection or coupling may be implemented in a wired or wireless manner. Functional units may be implemented as hardware, software or a combination of hardware and software.

Techniques in connection with lab-on-a-chip systems are described below. The lab-on-a-chip systems described herein use one or more functionalized optical waveguides to provide integrated optical excitation and/or detection. In particular, according to the various examples described herein, it may be possible for the functionalized optical waveguides to have input coupling regions and/or output coupling regions that implement an imaging optical function. Spatially resolved measurements may also thereby be performed. The imaging optical function may have wavelength selectivity. It is also possible to selectively address different reaction chambers in a wavelength-resolved manner.

Compared to conventional labs-on-a-chip, various effects may be achieved. Some effects are listed below. For example, it is possible to achieve a particularly high degree of integration, that is to say a particularly high level of miniaturization/compactness. Local targeted optical excitation is possible; this is not possible for example using classic freely propagating optical illumination—for instance using a separate microscopy device—in line with reference implementations. Local targeted detection is also possible; this is not possible using a classic camera function or microscope function in line with reference implementations. It is also possible to eliminate the potential fluorescence of the substrate caused by excitation, currently not possible due to undifferentiated excitation/illumination. To this end, the partially periodic structure may be designed such that it does not forward or image the wavelength range of the fluorescent light of the substrate, but on the contrary reflects or transmits it, for instance, while at the same time the fluorescent light from the reaction chamber is forwarded or imaged. The "Limit of Detection" (LOD) may be increased.

Various examples relate to the implementation of a lab-on-a-chip through a microfluidic network and at least one reaction chamber. In connection with labs-on-a-chip, in particular the space-saving should be mentioned as an advantage, since complex processes have to take place in the smallest of spaces. Due to the size of the miniaturized laboratory, it is also very easy to transport, which makes it interesting, inter alia, for medical first aid outside GP surgeries and hospitals.

Generally speaking, a lab-on-a-chip thus comprises a microfluidic network and one or more reaction chambers. Liquids may be moved through the microfluidic network, for example by capillary forces. Extensive biological, chemical and/or physical processes may take place on an LOC according to the examples described herein—in particular in the one or more reaction chambers. The functionality of the microfluidic network may be increased by active components such as microvalves, pumps and/or sensors that are integrated into the microfluidic network.

The labs-on-a-chip have a wide range of applications. For example, there may be applications in the following fields: medical-biological research, chemical analysis or in-line process control for pharmacy, biotechnology and modern chemistry. The lab-on-a-chip may be characterized according to various physical properties. These include in particular: type of microfluidics; method of excitation; detection technology.

Exemplary applications for a lab-on-a-chip that may be implemented through such processes comprise: microarray analysis and next generation sequencing (NGS). Some applications comprise analyzing liquids or biological samples with the optical detection and analysis of fluorescent biomolecules. Other applications comprise blood analysis, malaria detection, fluorescence measurements, cell separation, etc. In the various examples described herein, all such applications or else other applications may be implemented by the lab-on-a-chip. The specific implementation of the lab-on-a-chip or the specific application or applications that are provided by the lab-on-a-chip are not essential to the techniques described herein. In other words, the techniques described herein may be combined with a wide variety of implementations of the lab-on-a-chip.

According to various examples, a description is given of an ultra-compact, multifunctional lab-on-a-chip system. The lab-on-a-chip system comprises a microfluidic network having one or more reaction chambers. The lab-on-a-chip system also comprises one or more multifunctional waveguides for integrated optical excitation and/or integrated optical detection of samples in the one or more reaction chambers.

For example, lateral input coupling into at least one of the one or more multifunctional waveguides could take place.

According to the various examples, a transparent detection function may be made possible, that is to say the light from the reaction chamber may be received by the at least one waveguide and guided to a detector. This may take place without significant degradation of the microfluidic function.

As may be seen in FIGS. 1-5, light from the one or more reaction chambers, in other words light that is emitted from the one or more reaction chambers, is at least partially coupled into the detection waveguide by an at least partially periodic structure. The input coupling results in the light being steered in the direction of a propagation direction, such that it is propagated along the propagation direction in the waveguide in the direction of a detector. The at least partially periodic structure may be arranged on an end face of the waveguide perpendicular to the propagation direction, or on an interface of the waveguide that extends along the propagation direction, for example on an interface of the detection waveguide facing and/or opposite the reaction chamber. The detector may be arranged on an end face along the propagation direction of the light, or not along the propagation direction, for example at an angle, for example, perpendicular, to the propagation direction.

As may also be seen in FIGS. 1-5, light is coupled out, through an at least partially periodic structure, from the illumination waveguide into surroundings of the illumination waveguide in which a microfluidic network is arranged, such that at least part of the output-coupled light impinges on the at least one reaction chamber.

According to various examples described herein, provision may thus be made for integrated optical excitation and/or integrated optical detection. This means that, according to various examples, it is not necessary to use external equipment—such as for example a microscope with an illumination module—for optical detection and analysis.

However, in some examples, it is in this case also additionally possible to carry out external optical excitation and/or detection in addition to the integrated optical excitation and/or optical detection. This means that a lab-on-a-chip system, as described herein, may be used for integrated optical detection, for example with an integrated multi-pixel detector, in order to obtain a corresponding measurement image of at least one reaction chamber; and at the same time an external microscopy device may be used to capture a further measurement image of the same at least one reaction chamber.

This may be enabled through the transparent design of the least one waveguide—for example in a predetermined wavelength range, for instance in the visible wavelength range—such that wavelength-multiplexed measurements may be carried out using the microscope and an on-chip detector.

The integrated excitation/illumination function based on an optical waveguide enables spectrally selective illumination of the one or more reaction chambers, both spatially and temporally. The integrated transparent detection function enables in-situ detection.

Using the techniques described herein, it is thus possible to implement spectrally selective illumination or excitation of the liquid or biological samples to be analyzed using an integrated multifunctional illumination waveguide.

As an alternative or in addition, it is also possible to implement a transparent detection function by using a corresponding optical detection waveguide. This could be integrated for example into a cover of the microfluidic network.

Using such techniques, it may be possible to capture an image of the one or more reaction chambers in one detection step in the near field.

The lab-on-a-chip described herein is also particularly suitable for detecting a low photon flux, as is typically the case with fluorescence from biological samples of a limited quantity. Input coupling into a detection waveguide may in particular be made particularly efficient.

The lab-on-a-chip system may be integrated on one or more substrates. Such substrates may be made from: silicon, plastic and/or glass.

For example, it would be conceivable for both one or more optical waveguides—which are used for the optical excitation and/or detection—and a microfluidic network to be integrated on a common substrate.

In one variant, the optical part—that is to say the one or more optical waveguides—may be implemented separately from the microfluidic plate—that is to say from the microfluidic network. The lab-on-a-chip system effectively becomes a plug-in card that is plugged in between an illumination and imaging plate. Due to the compact design of illumination and imaging, the entire system may be implemented in the size of a card reader.

Figure 1:
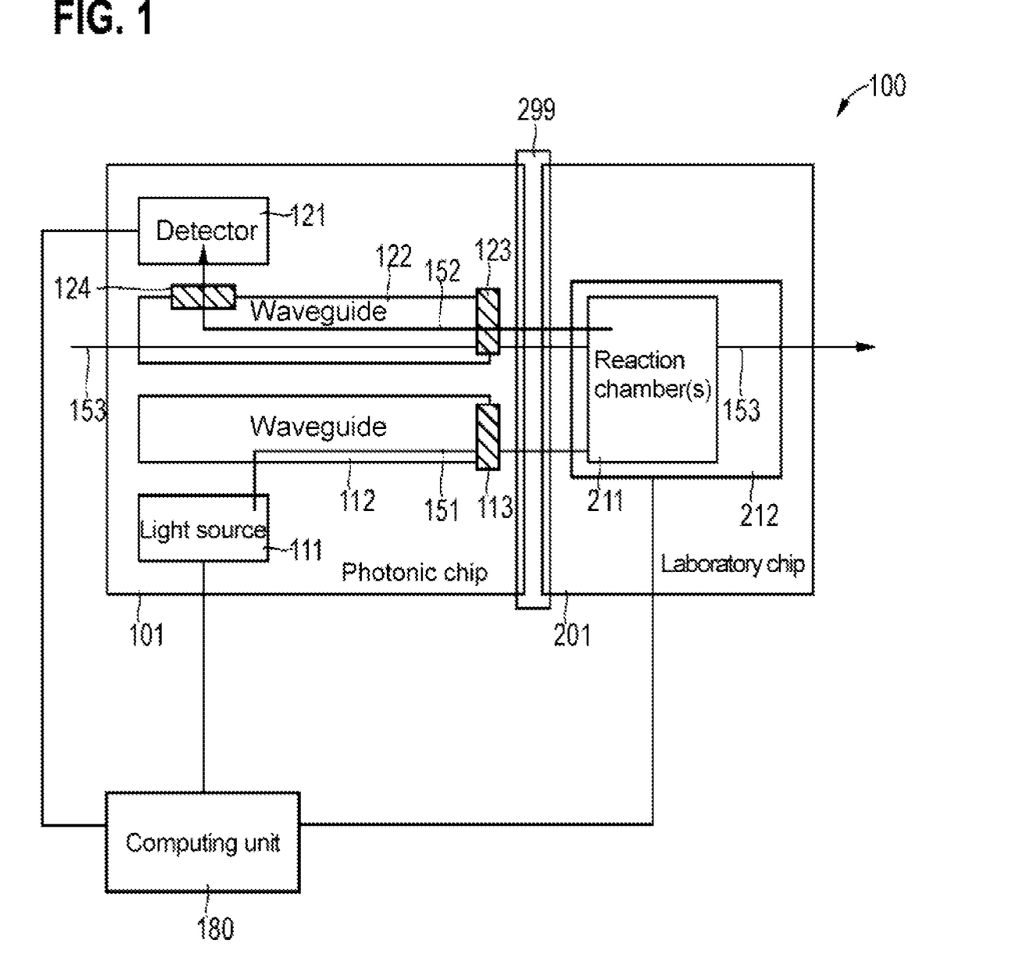
FIG. 1 is a schematic view of a lab-on-a-chip system according to various examples.

FIG. 1 is a schematic view of a lab-on-a-chip system 100. In the illustrated example, it has two substrates 101, 201, wherein optical elements are arranged on the substrate 101 (hereinafter photonic chip 101) and serve for illumination and detection, and a microfluidic network 212 having one or more reaction chambers 211 is formed on the substrate 201 (hereinafter laboratory chip 201). In some examples, the photonic chip 101 and the laboratory chip 201 could also be integrated on a single substrate.

As a general rule, the photonic chip 101 and the laboratory chip 201 may be arranged in incident light geometry (cf. FIG. 12) or transmitted light geometry (cf. FIGS. 2 to 5) (the schematic illustration from FIG. 1 is not intended to be limiting in this respect). In incident light geometry, contactless measurements may be carried out, which may enable rapid measurement of multiple laboratory chips in succession. In incident light geometry, it may furthermore be possible to design the back of the laboratory chip 201 to be absorbent; which may make it possible for example to place elements of the lab-on-a-chip there in a flexible manner. In transmitted light geometry, the photonic chip 101 may be positioned precisely in relation to the laboratory chip 201. A mechanical guide element 299 could for example be provided for this purpose In the example of FIG. 1, provision is also made for a mechanical guide element 299. This is configured to enable a relative movement of the two substrates 101, 201 with respect to one another. It is thereby possible for example to reuse the photonic chip 101 in connection with multiple laboratory chips 201. As a general rule, a mechanical guide element 299 may be used both in incident light geometry and in transmitted light geometry.

A stop position may be defined by the guide element 299, in which the laboratory chip 201 and the photonic chip 101 are positioned so as to allow optical excitation and/or optical detection of liquids in the reaction chambers.

Next, details in connection with the photonic chip 101 will be described. In the example of FIG. 1, this comprises a detection waveguide 122 and an illumination waveguide 112. As a general rule, it would be conceivable for the photonic chip 101 to comprise either the detection waveguide 122 or the illumination waveguide 112.

The detection waveguide 120 has an at least partially periodic structure 123 that is implemented for example by a multiplicity of volume holograms or a relief grating on a surface of the detection waveguide 120. The partially periodic structure 123 could also be adhesively bonded by way of a film. The at least partially periodic structure 123 could have a refractive and/or reflective beam shaping component; for example, the at least partially periodic structure 123 could implement a Fresnel lens in such a case. Various examples regarding the implementation of the partially periodic structure 123 were discussed above in connection with Table 1.

In this case, the at least partially periodic structure 123 is configured to couple light 152 from surroundings of the detection waveguide 122 into the detection waveguide 122. For example, the at least partially periodic structure may be configured to transmit the light 152 with an imaging optical function. In this case, different pixels of this imaging optical function may be associated with different wavelengths of the light 152. Depending on the angle of incidence, the coupling efficiency may be selectively high for specific wavelengths (wavelength selectivity). This means that, for example, different processes may be detected in different reaction chambers in a wavelength-resolved manner.

In the relative positioning of the laboratory chip 201 with respect to the photonic chip 101 as illustrated in FIG. 1, the one or more reaction chambers 211 are located in these surroundings. This means that the light 152 from the one or more reaction chambers is coupled into the detection waveguide 122. This light 152 then passes through the detection waveguide 122 and is guided, via an output coupling structure 124, to a detector 121—for example a multi-pixel detector. The detector may be actuated by a computing unit 180 so as to capture images.

The at least partially periodic structure 123 thus forms an input coupling region. The at least partially periodic structure 123 and the output coupling region 124 are configured to generate an image of the one or more reaction chambers 211 on a sensitive surface of the detector 121.

The illumination waveguide 112 is arranged between a light source 111—which may also be actuated by the computing unit 180 so as to emit light 151—and the one or more reaction chambers 211. The illumination waveguide 112 comprises an at least partially periodic structure 113—see Table 1 for different options. The at least partially periodic structure 113 is configured to couple the light 151 out of the illumination waveguide 112 into the surroundings of the illumination waveguide 112, wherein the one or more reaction chambers 211 are located in the surroundings.

The at least partially periodic structure 113 may in principle be designed so as to be identical to or correspond to the at least partially periodic structure 123.

The illumination waveguide 112 may also comprise an input coupling structure close to the light source 111 in order to couple the light 151 into the illumination waveguide 112 (not shown in FIG. 1). The input coupling structure could in turn be designed as an at least partially periodic structure—cf. Table 1.

The at least partially periodic structure 113—for example in combination with an input coupling structure of the illumination waveguide 112—may be configured to transmit the light 151 with an imaging optical function. Different pixels of the imaging optical function may in this case be positioned at different positions of a specific reaction chamber 211; or else also in different reaction chambers. Different pixels of the imaging optical function may be associated with different wavelengths of the light 151, that is to say provision may be made for wavelength selectivity. This means that, for example, different processes may be excited in different reaction chambers in a wavelength-resolved manner.

The example of FIG. 1 illustrates that the light 151 is emitted by the light source 111 and the light 152 is detected by the detection waveguide 122. For example, the light 152 could be generated by fluorescence of material in one of the reaction chambers 211, with the fluorescence being stimulated by the light 151. In other examples, it would also be conceivable for the light 151 emitted by the light source 111 to be guided directly from the detection waveguide 122 to the detector 121. A corresponding selection may in turn be made based on the wavelength dependency of the imaging optical functions of the partially periodic structures 113, 123. For example, the computing unit 180 could be configured to actuate the light source 111 in a time-dependent manner in order to feed the light 151 into the optical illumination waveguide 112 with an adjustable wavelength that is selected depending on the wavelength dependency of the optical imaging function of the partially periodic structure 113 and optionally the partially periodic structure 123. Corresponding pixels of the multi-pixel detector 121 that are assigned to the same wavelength could be read out in a temporally correlated manner. This thus means that the computing unit 180 is able to take into account the wavelength selectivity of the partially periodic structures 113, 123.

FIG. 1 also illustrates that the computing unit 180 is able to control the microfluidic network 212, this generally being optional. For example, specific microvalves, etc. could be controlled. This may take place in a manner coordinated with the actuation of the light source 111 and/or of the detector 121.

FIG. 1 illustrates that additional light 153 passes through the at least partially periodic structure 123 and passes through the one or more reaction chambers 211. This additional light 153 may be emitted for example by an illumination module of a microscopy device and may enter a lens of the microscopy device. Measurements may thereby be carried out using the detector 121 and at the same time images may be captured using the microscopy device. This is made possible because the at least partially periodic structure 123 is at least partially transparent to light in the corresponding wavelength range, for example to visible light.

Figure 2:
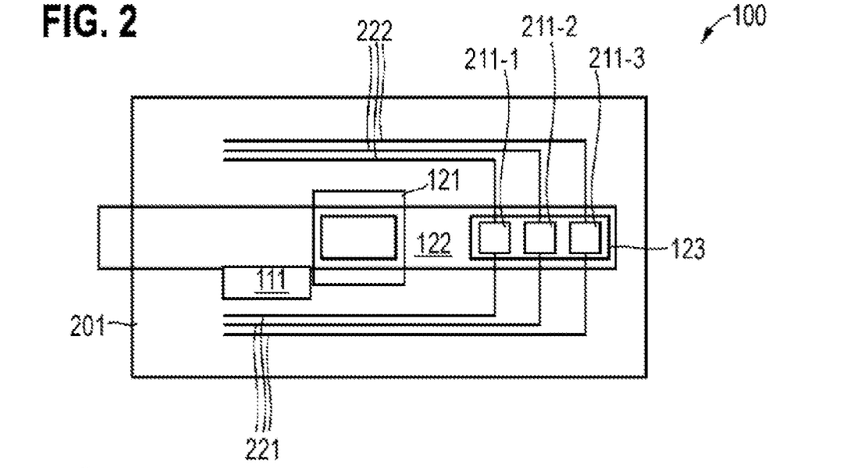
FIG. 2 shows a top view of one exemplary implementation of a lab-on-a-chip system according to various examples.
Figure 3:
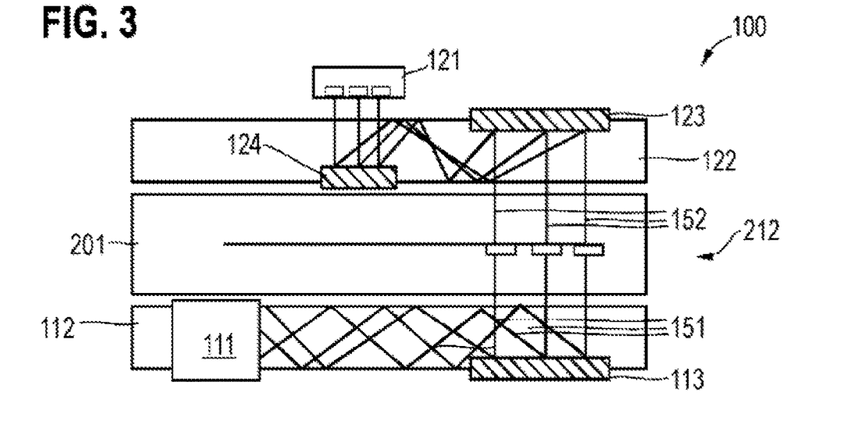
FIG. 3 is a side view of the exemplary implementation of the lab-on-a-chip system from FIG. 2.

Based on the schematic illustration of the lab-on-a-chip system 100, one possible structural implementation is discussed below in connection with FIGS. 2 and 3. In this case, FIG. 2 shows a top view of the lab-on-a-chip system 100, and FIG. 3 shows a side view. In this case, the illustrated structural implementation—here in transmitted light geometry, that is to say the microfluidic network 212 is arranged between the waveguides 112, 122—is only an example. It could also be measured in incident light geometry.

In the illustrated example, the microfluidic network 212 comprises multiple feed lines 221, 222 to multiple reaction chambers 211-1-211-3 (the sources are not illustrated in FIG. 2).

It may be seen from FIG. 3 that, by virtue of imaging optical functions of the partially periodic structure 113 and of the partially periodic structure 123—for instance in combination with the corresponding wavelength dependency (this wavelength dependency would mean that the different beams in FIG. 3 indicate the propagation of light with different wavelengths)—different reaction chambers 211-1-211-3 are able to be illuminated selectively (for example by actuating the light source 111 so as to emit corresponding light) and the light 152 emitted by the different reaction chambers is able to be imaged onto different pixels (indicated in FIG. 3) of a sensitive surface of the detector 121.

Figure 4:
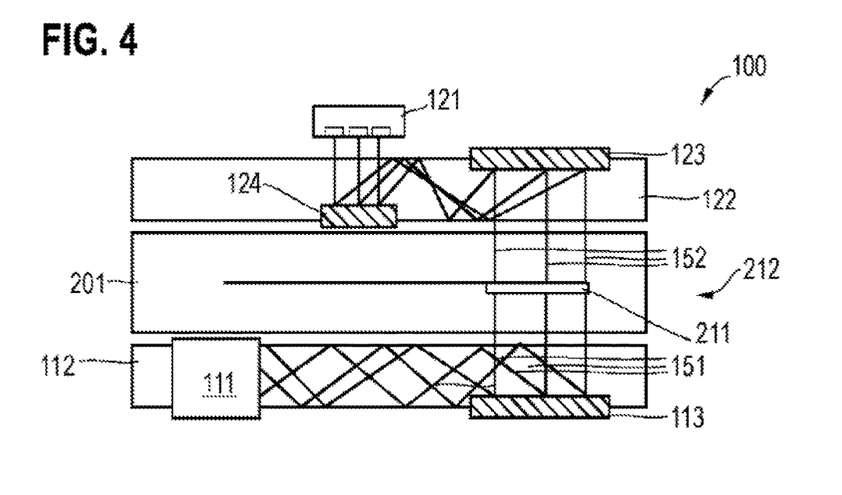
FIG. 4 is a side view of a variant of the exemplary implementation of the lab-on-a-chip system from FIG. 2.

Another situation is illustrated in FIG. 4. FIG. 4 corresponds, in principle, to FIG. 3, wherein the lab-on-a-chip system 100 illustrated in FIG. 4 comprises a single reaction chamber 211. The at least partially periodic structure 123 and the output coupling region 124 are configured so as to image pixels of the image, which correspond to object points at different positions within the reaction chamber 211, onto different pixels of the multi-pixel detector 121.

Figure 5:
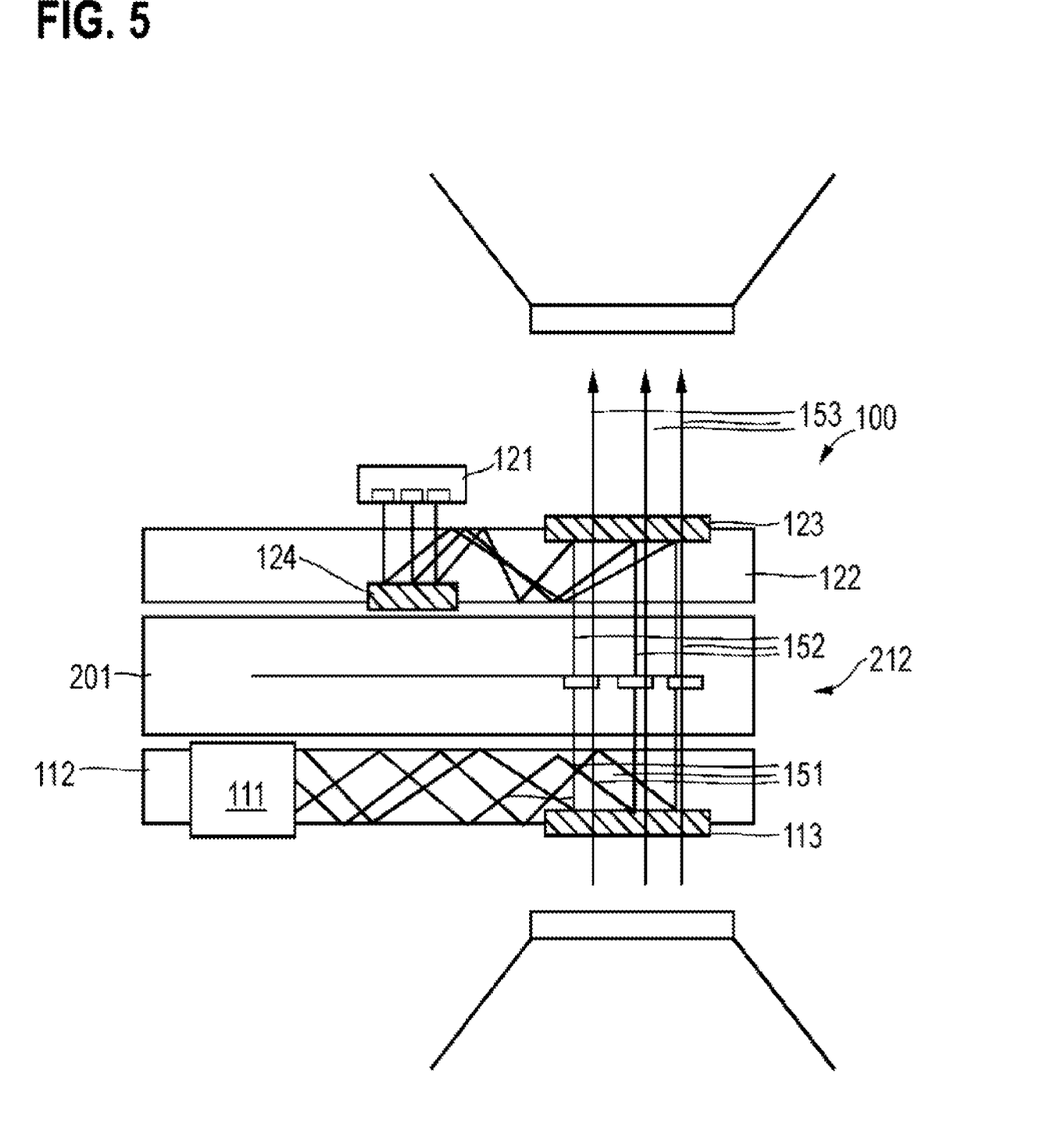
FIG. 5 shows the use of a microscopy device for the exemplary implementation of the lab-on-a-chip system from FIG. 2 in the side view according to FIG. 3.

FIG. 5—which corresponds, in principle, to FIG. 3—illustrates how, due to the partially transparent design of the optical waveguides 112, 122, measurements may be carried out in parallel with additional light 153 from a microscopy device.

Figure 6:
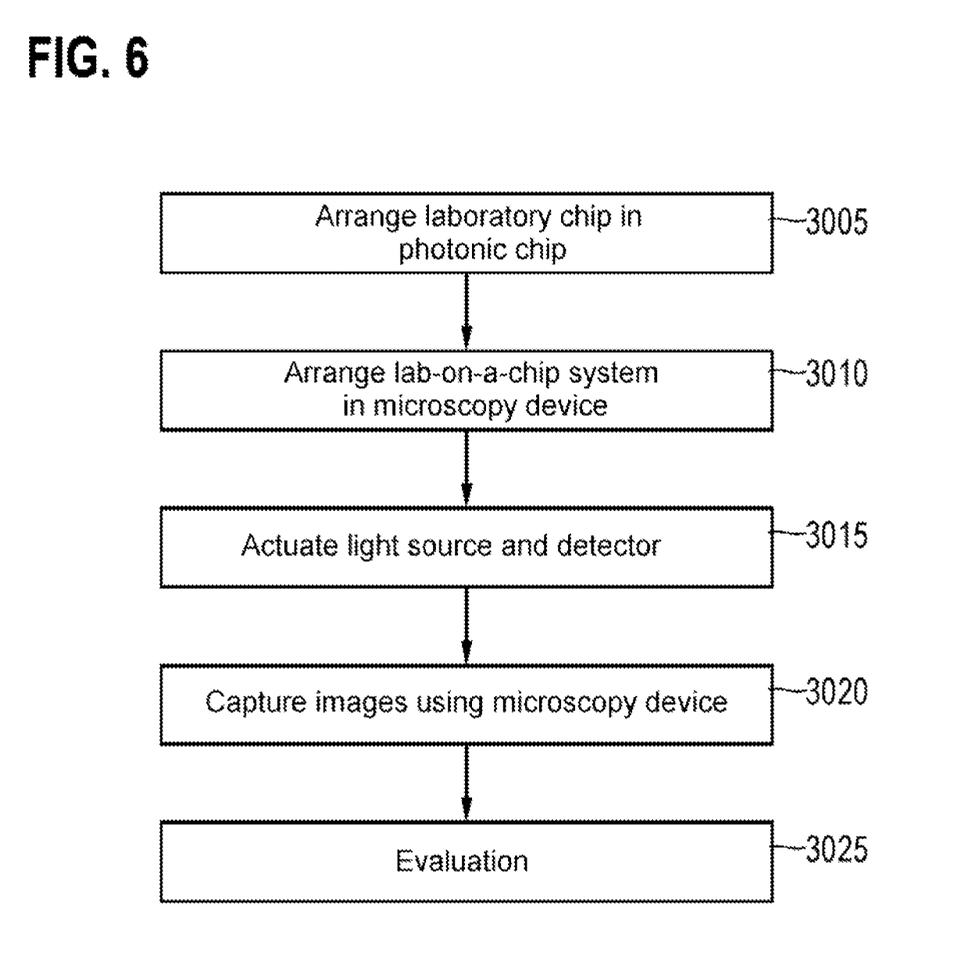
FIG. 6 is a flowchart of one exemplary method.

FIG. 6 is a flowchart of one exemplary method.

First of all, in optional box 3005, the laboratory chip 201 may be arranged in relation to the photonic chip 101. For example, the guide element 299 could be used for this purpose, for instance to insert the laboratory chip 201 between the two waveguides 112, 122. The lab-on-a-chip system 100 is thereby formed. An automated arrangement could take place, for example in an assembly line application (cf. FIG. 12).

Box 3005 may be omitted if the microfluidic network 212 and the one or more waveguides 112, 122 are integrated on a single substrate.

Optionally, it would then be possible, in box 3010, to fix the lab-on-a-chip system 100 on a sample holder of a microscopy device, cf. FIG. 5.

The measurement may then be performed, as shown in box 3015. To this end, the computing unit 180 could actuate both the light source 111 and the detector 121.

This may take place synchronously. For example, depending on the used wavelength of the light source 111, a different reaction chamber could be addressed, which corresponds to reading out a corresponding pixel of the multi-pixel detector 121. In this case, the wavelength dependency of the imaging optical functions of the output coupling and input coupling regions is taken into account. This may be achieved through appropriate formation of volume holograms. Another variant would be to use a Fresnel lens, that is to say with a refractive component, in addition to the diffractive component.

At the same time as box 3015, an image capture could also take place using the microscopy device in optional box 3020.

In optional box 3025, an evaluation may take place. For example, it would be possible to count objects of a pre-defined type in the image of the multi-pixel detector, as obtained from box 3015—for instance by way of the computing unit 180.

Applications such as blood analysis or else malaria detection may thereby be implemented, for example.

Next, various variants for implementing an at least partially periodic structure according to the various examples described herein will be explained in connection with the following figures. In this case, various variants are explained in connection with the detection waveguide 122, such that this implements an input coupling region. However, corresponding variants may also be used in connection with another optical waveguide, for instance the illumination waveguide 112. Corresponding variants may also implement an output coupling region.

Figure 7:
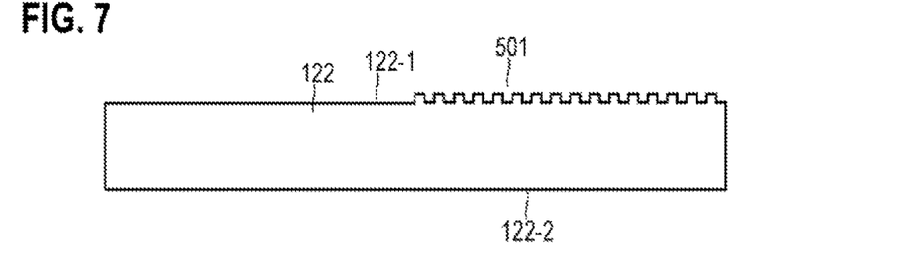
FIG. 7 illustrates one exemplary implementation of an at least partially periodic structure in the form of a diffractive grating according to various examples.

FIG. 7 illustrates aspects in connection with a partially periodic structure 501 that is implemented in the form of a diffractive grating structure (cf. Table 1: Example I, Example IV). In this case, the diffractive grating structure 501—a DOE—is integrated on a top side 122-1 of the detection waveguide 122, that is to say in the form of a surface relief (produced for instance by heat-induced material removal by way of laser scribing, or by stamping methods). Using the diffractive grating structure 601 in the example of FIG. 7, light is able to be input-coupled via the bottom side 122-2. As an alternative or in addition, the diffractive grating structure 501 could also be arranged on the bottom side 122-2—that is to say facing the reaction chamber.

For example, a side of the diffractive grating structure 501 that faces away from the detection waveguide 122 could be coated with a reflective material or an absorbent material. An intrinsic wavelength selectivity of the diffractive grating structure 501 may thereby be modified.

The thickness of the diffractive grating structure 501 is small in comparison with the thickness of the detection waveguide 122. A high degree of integration may thereby be achieved.

Figure 8:
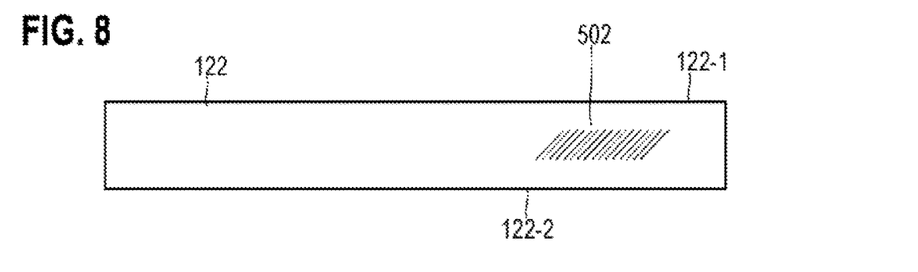
FIG. 8 illustrates one exemplary implementation of an at least partially periodic structure in the form of a volume hologram according to various examples.

FIG. 8 illustrates aspects in connection with a partially periodic structure 502, implemented here in the form of a diffractive volume hologram (cf. Table 1, Example II). A diffractive, beam-shaping effect may be achieved by modulating the refractive index. The volume hologram 502 is embedded in the detection waveguide 122. Multiple volume holograms could also be used adjacently (multiplexing).

Figure 9:
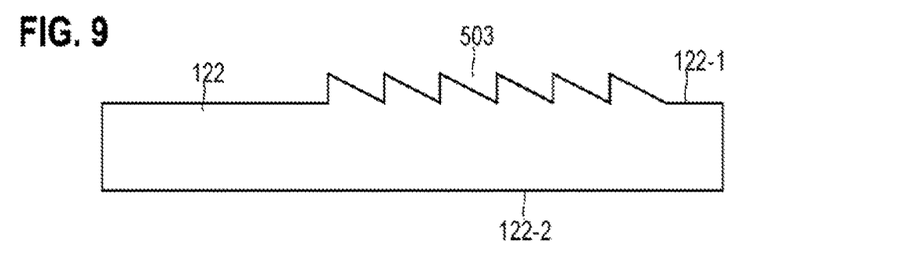
FIG. 9 illustrates one exemplary implementation of an at least partially periodic structure in the form of a refractive grating structure according to various examples.

FIG. 9 illustrates aspects in connection with a partially periodic structure 503, implemented here in the form of a refractive Fresnel structure (cf. Table 1: Example V). It is apparent from comparing FIG. 7 with FIG. 9 that the refractive periodic structure 503 has a greater periodicity and, moreover, the thickness of the structure perpendicular to the width of the detection waveguide 122 is greater than the corresponding parameters of the grating structure 501. In particular, the thickness of the refractive grating structure 503 is not small in comparison with the thickness of the detection waveguide 122.

For example, typical thicknesses of the DOE 501 in FIG. 7 would be in the range of 0.5 to 10 μm; and typical thicknesses of the refractive structure 503 from FIG. 9 would be in the range of 80 μm or greater.

The various Fresnel units of the Fresnel structure may each have curved surfaces (not shown in FIG. 9) in order to produce a refractive imaging effect.

The periodicity of the reflective periodic structure 503 may correspond to a spatial resolution of an imaging optical function. This means that a corresponding pixel may be obtained for each Fresnel unit. This thus means that the various Fresnel units of a Fresnel structure may be assigned for example to different reaction chambers that are to be imaged by different pixels (cf. FIG. 3). In contrast thereto, many grating unit cells of the diffractive grating structure 501 from FIG. 7 may interact in a phase-coherent manner (through constructive or destructive interference) in order to define a location point of a corresponding imaging optical function.

It would be possible for one or more filter layers to be applied to the Fresnel structure 503. For example, different "prism" units of the Fresnel structure 503 could be coated with different filters, that is to say for example filters that absorb different wavelengths. A wavelength dependency of the input coupling of light may thereby be achieved, in particular, for example, a different wavelength dependency for different location points of an imaging function.

Figure 10:
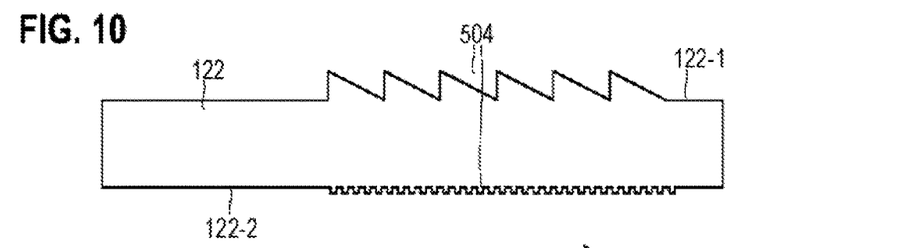
FIG. 10 illustrates one exemplary implementation of an at least partially periodic structure in the form of a combination of a reflective grating structure with a diffractive grating according to various examples.

FIG. 10 illustrates aspects in connection with a partially periodic structure 504, designed here in the form of a combined diffractive-refractive structure (cf. Table 1, Example III). In the example of FIG. 10, a grating structure is provided on the bottom side 122-2 of the detection waveguide 122 and a Fresnel structure is provided on the top side 122-1. The grating structure and the Fresnel structure could also be integrated together on the same side. For example, aberrations in the Fresnel structure could be reduced or compensated for by the diffractive structure.

Figure 11:
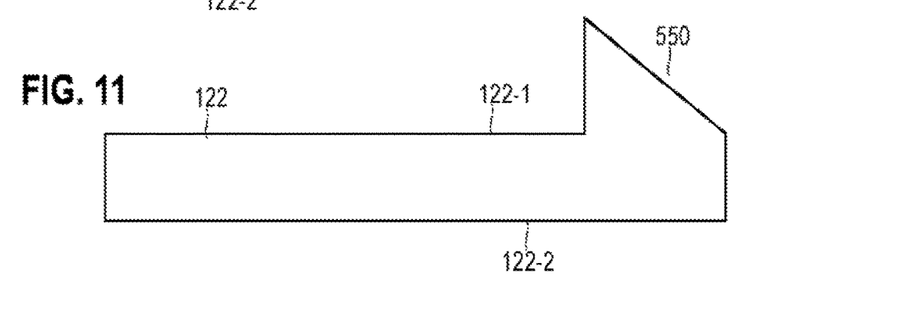
FIG. 11 illustrates a reference implementation of a reflective structure for the input coupling or output coupling of light.

FIG. 11 illustrates aspects in connection with a non-periodic structure, for reference. The non-periodic structure is comparatively thick and thereby prevents a high level of integration of the input coupling region, in comparison with the variants of the at least partially periodic structures in FIG. 7 to FIG. 10.

Figure 12:
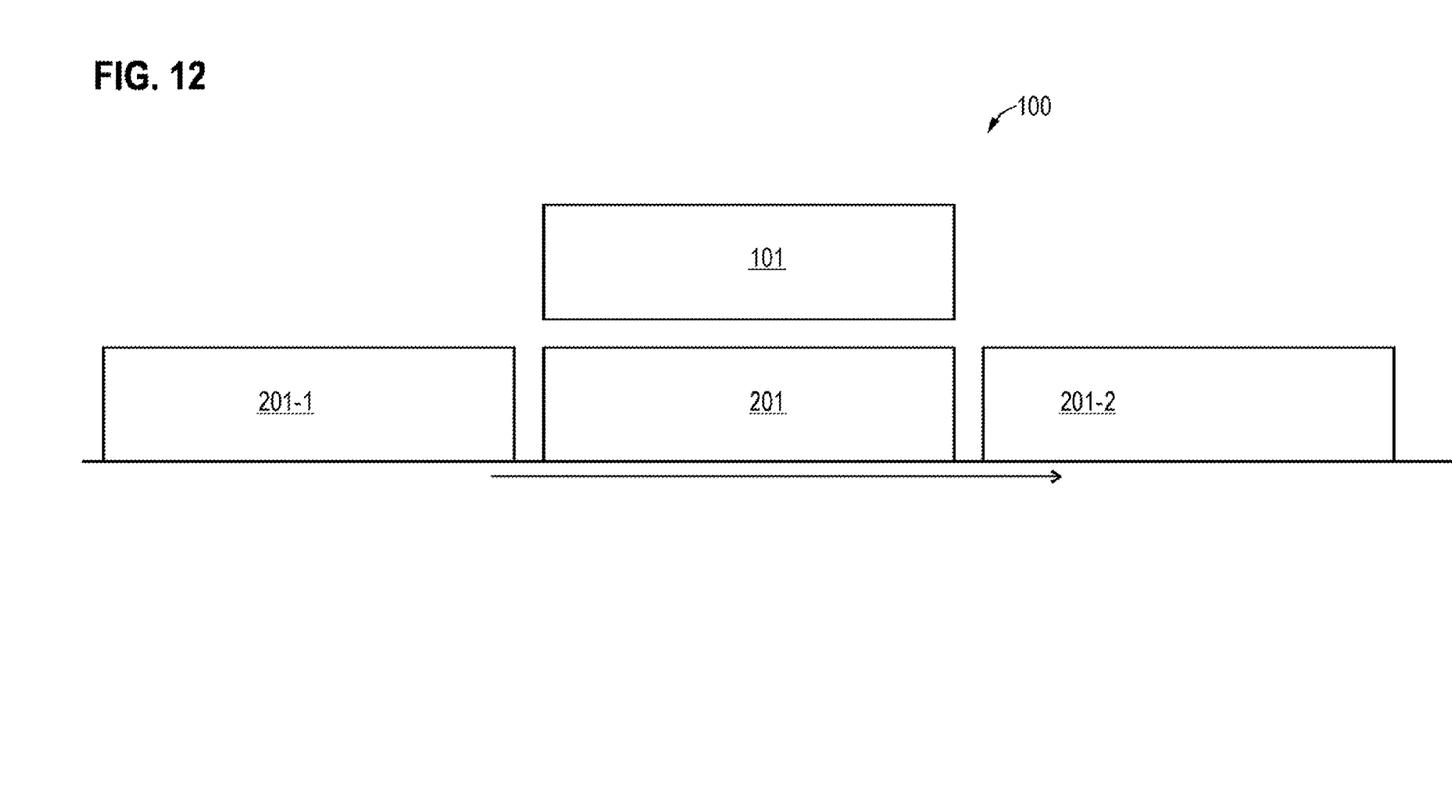
FIG. 12 schematically illustrates assembly line positioning of multiple laboratory chips with respect to a photonic chip.

FIG. 12 illustrates aspects in connection with one possible implementation of the lab-on-a-chip system 100. In the example of FIG. 12, the laboratory chip 201 and the photonic chip 101 are not arranged in a "sandwich structure" according to the examples from FIG. 2 to FIG. 5, but are arranged laterally to one another. This corresponds to a "reflected light geometry", in contrast to a "transmitted light geometry" according to FIG. 2 to FIG. 5. This means that measurements may be carried out in reflections; this means that light emitted from the illumination waveguide is reflected into one or more reaction chambers 211, and then collected in reflection via the detection waveguide.

Such a reflected light geometry has certain advantages. For example, it may not be necessary to set up a mechanical intervention by way of a guide element 299 between the laboratory chip 201 and the photonic chip 101. The guide element may be omitted. It could be possible to place multiple laboratory chips 201, 201-1, 201-2 in a measurement position in relation to the photonic chip 101 in serial automated processing (indicated in FIG. 12 by the horizontal arrow), for example using a conveyor belt or a "pick and place" machine. The optical coupling takes place only via an interface, which makes relative positioning easier. A high throughput of different measurements may be achieved.

In summary, a description has been given above of techniques that enable a particularly high level of integration of a lab-on-a-chip system. In particular, the optical detection and/or the optical illumination or excitation may be provided with a high degree of integration. This may be made possible through the use of one or more at least partially periodic optical structures that enable functionalization of an illumination waveguide and/or of a detection waveguide. Classic separate lens elements or separate prisms, which would typically take up a comparatively large amount of space, may thereby be dispensed with. At the same time, efficient input coupling and/or output coupling of light into and/or out of corresponding waveguides may be achieved through a suitable design of the at least partially periodic optical structures. This efficient input coupling and/or output coupling may be supplemented with further functionalization, such as a tailored wavelength dependency that is adapted to the microfluidic laboratory to be examined. In addition, images from different location points within a reaction chamber could be used to enable complicated counting applications as well. Interfering light—for instance caused by fluorescence of the substrate—may be filtered. A description has also been given above of different structural implementations of the lab-on-a-chip system that are suitable for different application cases—for instance individual testing or mass tests—wherein the decoupling of optics and microfluidics is able to be adapted here to the corresponding application case by way of an appropriate mechanical configuration (guide element, incident light geometry versus transmitted light geometry).

It goes without saying that the features of the embodiments and aspects of the invention described above may be combined with one another. In particular, the features may be used not only in the combinations described but also in other combinations or on their own without departing from the scope of the invention.

For example, a description has been given above of various implementations of a lab-on-a-chip system having a detection waveguide with a partially periodic structure for input coupling of light. It would also be possible to use a lab-on-a-chip system only having an illumination waveguide with an appropriately configured partially periodic structure. It would also be possible—for example, if illumination and detection are performed at different times—for the same optical waveguide to be used both for illumination and for detection, that is to say for the same at least partially periodic structure to be used once for output coupling of light and once for input coupling of light. It is then possible to use a beam splitter to guide the detected light to a detector and to receive the light to be emitted from a light source.

The invention claimed is:

1. A lab-on-a-chip system, comprising:
an optical detection waveguide that has an at least partially periodic structure that is configured to couple light from surroundings of the optical detection waveguide into the optical detection waveguide, and
a microfluidic network, wherein the microfluidic network has multiple lines and at least one reaction chamber,
wherein the lab-on-a-chip system is configured such that the at least one reaction chamber of the microfluidic network is able to be arranged in the surroundings of the optical detection waveguide and light from the surroundings of the optical detection waveguide in which the at least one reaction chamber is located is coupled into the optical detection waveguide.

2. The lab-on-a-chip system according to claim 1, further comprising:
a multi-pixel detector having a sensitive surface,
wherein the optical detection waveguide has an output coupling region that is arranged adjacent to the multi-pixel detector and that is configured to couple the light out of the optical detection waveguide in the direction of the multi-pixel detector,
wherein the at least partially periodic structure and the output coupling region are configured to generate an image of the at least one reaction chamber on the sensitive surface.

3. The lab-on-a-chip system according to claim 2,
wherein the at least one reaction chamber comprises a multiplicity of reaction chambers,
wherein the at least partially periodic structure and the output coupling region are configured to image pixels of the image, which correspond to object points in different reaction chambers of the multiplicity of reaction chambers, onto different pixels of the multi-pixel detector.

4. The lab-on-a-chip system according to claim 2,
wherein the at least partially periodic structure and the output coupling region are configured to image pixels of the image, which correspond to object points at different positions within one of the at least one reaction chambers, onto different pixels of the multi-pixel detector.

5. The lab-on-a-chip system according to claim 4, further comprising:
a computing unit that is configured to count objects of a predefined type in an image of the multi-pixel detector.

6. The lab-on-a-chip system according to claim 1,
wherein the optical detection waveguide and the microfluidic network are arranged on a common substrate.

7. The lab-on-a-chip system according to claim 1,
wherein the optical detection waveguide and the microfluidic network are arranged on different substrates,
wherein the lab-on-a-chip system further comprises:
a guide element that is configured to enable a relative movement of the different substrates in relation to one another.

8. The lab-on-a-chip system according to claim 1,
wherein the at least partially periodic structure is configured to transmit the light with an imaging optical function,
wherein different pixels that are defined by the imaging optical function are associated with different wavelengths of the light.

9. The lab-on-a-chip system according to claim 1, further comprising:
an optical illumination waveguide that comprises a further at least partially periodic structure that is configured to emit the light or additional light into the reaction chamber.

10. The lab-on-a-chip system according to claim 9, further comprising:
a light source that is optically coupled to the optical illumination waveguide and that is configured to emit the light and/or the additional light with an adjustable wavelength, and
a computing unit that is configured to actuate the light source in order to feed the light and/or the additional light into the optical illumination waveguide,
wherein the computing unit is furthermore configured to select the adjustable wavelength of the light and/or of the additional light on the basis of a wavelength dependency of an optical imaging function of the at least partially periodic structure and/or of the further at least partially periodic structure.

11. The lab-on-a-chip system according to claim 1,
wherein the at least partially periodic structure is implemented by a holographic optical element, HOE, comprising one or more volume holograms integrated into the detection waveguide or a hologram applied to the detection waveguide.

12. The lab-on-a-chip system according to claim 1,
wherein the at least partially periodic structure shapes the light through refraction and/or reflection.

13. The lab-on-a-chip system according to claim 1,
wherein the at least partially periodic structure shapes the light through diffraction as a diffractive optical element, DOE.

14. The lab-on-a-chip system according to claim 1,
wherein the at least partially periodic structure is at least partially transparent to visible light.

15. The lab-on-a-chip system according to claim 1,
wherein the at least partially periodic structure is configured to couple the light into the optical detection waveguide with a wavelength dependency,
wherein the at least one reaction chamber is integrated on a substrate,
wherein the wavelength dependency excludes coupling of additional light that is produced by fluorescence of the substrate into the optical detection waveguide, or allows coupling of additional light that is produced by fluorescence of the substrate into the optical detection waveguide only with suppression.

16. The lab-on-a-chip system according to claim 1,
wherein the lab-on-a-chip system obtains a measurement image based on the light coupled into the optical detection waveguide, and the lab-on-a-chip system further comprising
a microscopy device obtaining a further measurement image of the at least one reaction chamber at substantially the same time as capturing the measurement image.

17. The lab-on-a-chip system according to claim 1,
wherein the lab-on-a-chip system is configured for microscopic blood analysis or a fluorescence measurement.

18. A lab-on-a-chip system, comprising:
an optical illumination waveguide that has an at least partially periodic structure that is configured to couple light out of the optical illumination waveguide into surroundings of the optical illumination waveguide, and
a microfluidic network, wherein the microfluidic network has multiple lines and at least one reaction chamber,
wherein the lab-on-a-chip system is configured such that the at least one reaction chamber of the microfluidic network is able to be arranged in the surroundings of the optical illumination waveguide and light from the surroundings of the optical illumination waveguide in which the at least one reaction chamber is located is coupled into the optical illumination waveguide.

19. The lab-on-a-chip system according to claim 18,
wherein the at least partially periodic structure is configured to emit at least part of the output-coupled light to the at least one reaction chamber.

* * * * *